(12) United States Patent
Groh et al.

(10) Patent No.: US 8,230,701 B2
(45) Date of Patent: Jul. 31, 2012

(54) METHOD FOR FORMING FUSED SILICA GLASS USING MULTIPLE BURNERS

(75) Inventors: Raymond D Groh, Wilmington, NC (US); Brian Lee Harper, Painted Post, NY (US); John Edward Maxon, Canton, NY (US)

(73) Assignee: Corning Incorporated, Corning, NY (US)

( * ) Notice: Subject to any disclaimer, the term of this patent is extended or adjusted under 35 U.S.C. 154(b) by 605 days.

(21) Appl. No.: 12/154,908

(22) Filed: May 28, 2008

(65) Prior Publication Data
US 2009/0293545 A1    Dec. 3, 2009

(51) Int. Cl.
*C03B 37/018* (2006.01)

(52) U.S. Cl. .............................. 65/421; 65/413; 65/414

(58) Field of Classification Search ............ 65/413–423; 239/430
See application file for complete search history.

(56) References Cited

U.S. PATENT DOCUMENTS

| | | | | |
|---|---|---|---|---|
| 3,055,591 A * | 9/1962 | Shepard | | 239/13 |
| 4,599,098 A * | 7/1986 | Sarkar | | 65/421 |
| 5,211,732 A * | 5/1993 | Abbott et al. | | 65/421 |
| 5,696,038 A | 12/1997 | Maxon | | 501/54 |
| 5,788,730 A * | 8/1998 | Ruppert et al. | | 65/17.4 |
| 5,958,102 A * | 9/1999 | Shimada et al. | | 65/382 |
| 6,215,092 B1 * | 4/2001 | Goudeau et al. | | 219/121.59 |
| 6,321,573 B1 * | 11/2001 | Fritsche et al. | | 65/421 |
| 6,748,769 B2 * | 6/2004 | Ooishi et al. | | 65/421 |
| 7,716,951 B2 * | 5/2010 | Ooishi et al. | | 65/377 |
| 2002/0078714 A1 * | 6/2002 | Bird et al. | | 65/427 |
| 2003/0070450 A1 * | 4/2003 | Nakamura et al. | | 65/377 |
| 2004/0134236 A1 * | 7/2004 | Ishihara | | 65/421 |
| 2005/0247080 A1 * | 11/2005 | Fritsche et al. | | 65/17.4 |
| 2006/0207295 A1 * | 9/2006 | Huenermann | | 65/421 |

* cited by examiner

*Primary Examiner* — Matthew Daniels
*Assistant Examiner* — Jodi C Franklin
(74) *Attorney, Agent, or Firm* — Robert P. Santandrea

(57) ABSTRACT

A method for forming a silica glass blank includes generating soot using an array of soot producing burners, directing the soot along a first direction onto a bait, collecting the soot on the bait, imparting relative oscillatory motion having a repeat period between the array of soot producing burners and the bait along a second direction orthogonal to the first direction while collecting the soot, and offsetting the relative oscillatory motion by a selected distance along the second direction after each repeat period.

10 Claims, 8 Drawing Sheets

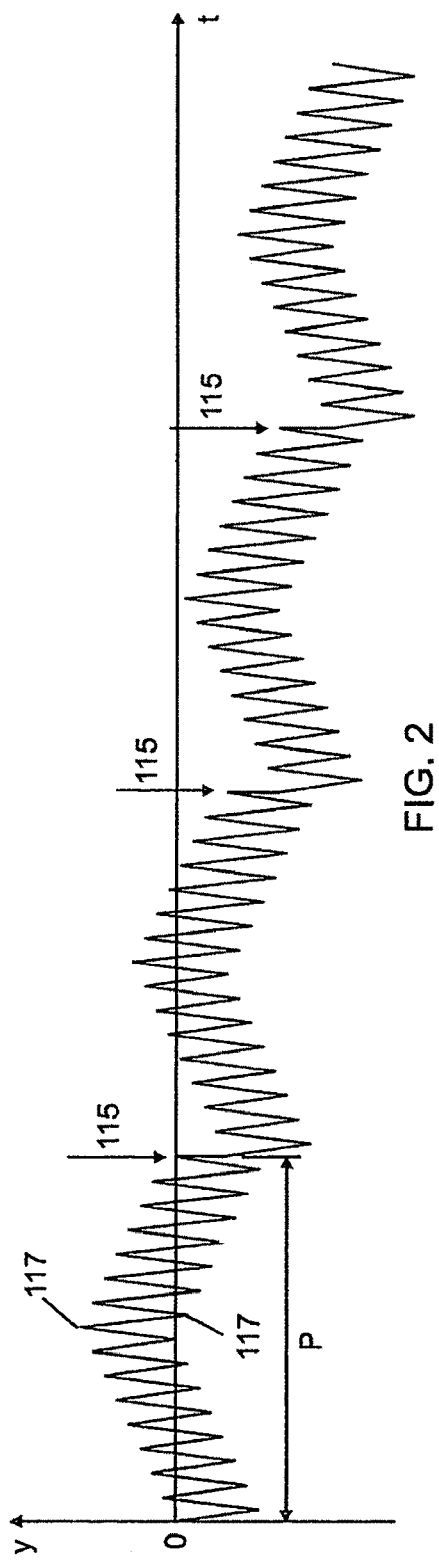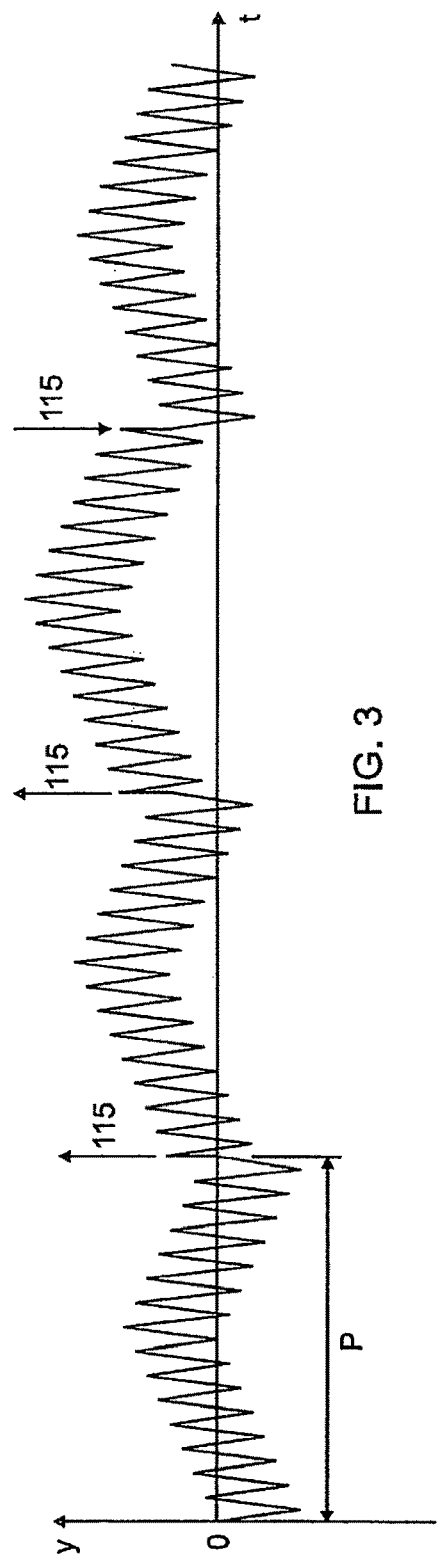

METHOD FOR FORMING FUSED SILICA GLASS USING MULTIPLE BURNERS

FIELD

The invention relates generally to methods and apparatus for making fused silica glass by flame hydrolysis. More specifically, the invention relates to a method and an apparatus for making a fused silica glass blank having low variation in composition and physical properties within the bulk of the glass.

BACKGROUND

High-purity fused silica glass is typically made by a flame hydrolysis process, which may be a soot-to-glass process or a direct-to-glass process. In both the soot-to-glass and direct-to-glass processes, silica precursor is passed into the flame of a burner to generate soot. In the direct-to-glass process, the soot is collected on a substrate or mandrel, commonly referred to in the art as a "bait," that is maintained at a temperature or range of temperatures conducive to immediate consolidation of the soot into dense glass. In the soot-to-glass process, the soot is collected on a bait that is maintained at a temperature or range of temperatures below which the soot can consolidate into dense glass. The soot accumulates on the bait to form a porous preform, which is subsequently consolidated into the dense glass in a separate step from the soot deposition step. To increase throughput or to make large parts, multiple burners are often used to generate multiple flames for converting the silica precursor into soot. The multiple burners are typically connected to a common manifold and receive a mixture of silica precursor and process gases supplied to the manifold to generate the soot. Each burner deposits soot over a small section of the bait. The amount and density of soot deposited on each small section of the bait may vary from one burner to the next due to factors such as differences in the burner design or dimensions and differences in the rate at which the mixture of precursor and process gases in the manifold is delivered to the burners. Consequently, there may be variations in composition, e.g., β-OH concentration, and/or physical properties, e.g., refractive index, within the final product. It is desirable to reduce or eliminate such variations in the final product.

SUMMARY

In one aspect, the invention relates to a method for forming a fused silica glass blank which comprises generating soot using an array of soot producing burners, directing the soot along a first direction onto a bait, collecting the soot on the bait, imparting relative oscillatory motion having a repeat period between the array of soot producing burners and the bait along a second direction orthogonal to the first direction while collecting the soot, and offsetting the relative oscillatory motion by a selected distance along the second direction after each repeat period.

In another aspect, the invention relates to an apparatus for forming a fused silica glass blank which comprises an array of soot producing burners for producing soot and directing the soot along a first direction, a support for a bait for collecting the soot positioned opposite to and spaced apart from the array of soot producing burners, and an array of burner shields disposed between the array of soot producing burners and the bait. Each burner shield is arranged in line with one of the soot producing burners. At least two of the burner shields have different lengths to compensate for differences in the amount and density of soot produced by the soot producing burners.

These and other features and advantages of the invention will be apparent from the following description and the appended claims.

BRIEF DESCRIPTION OF DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

FIG. 2 illustrates oscillatory motion with unidirectional drift for uniformly depositing soot on a bait.

FIG. 3 illustrate oscillatory motion with bidirectional drift for uniformly depositing soot on a bait.

DETAILED DESCRIPTION

Figure 1:
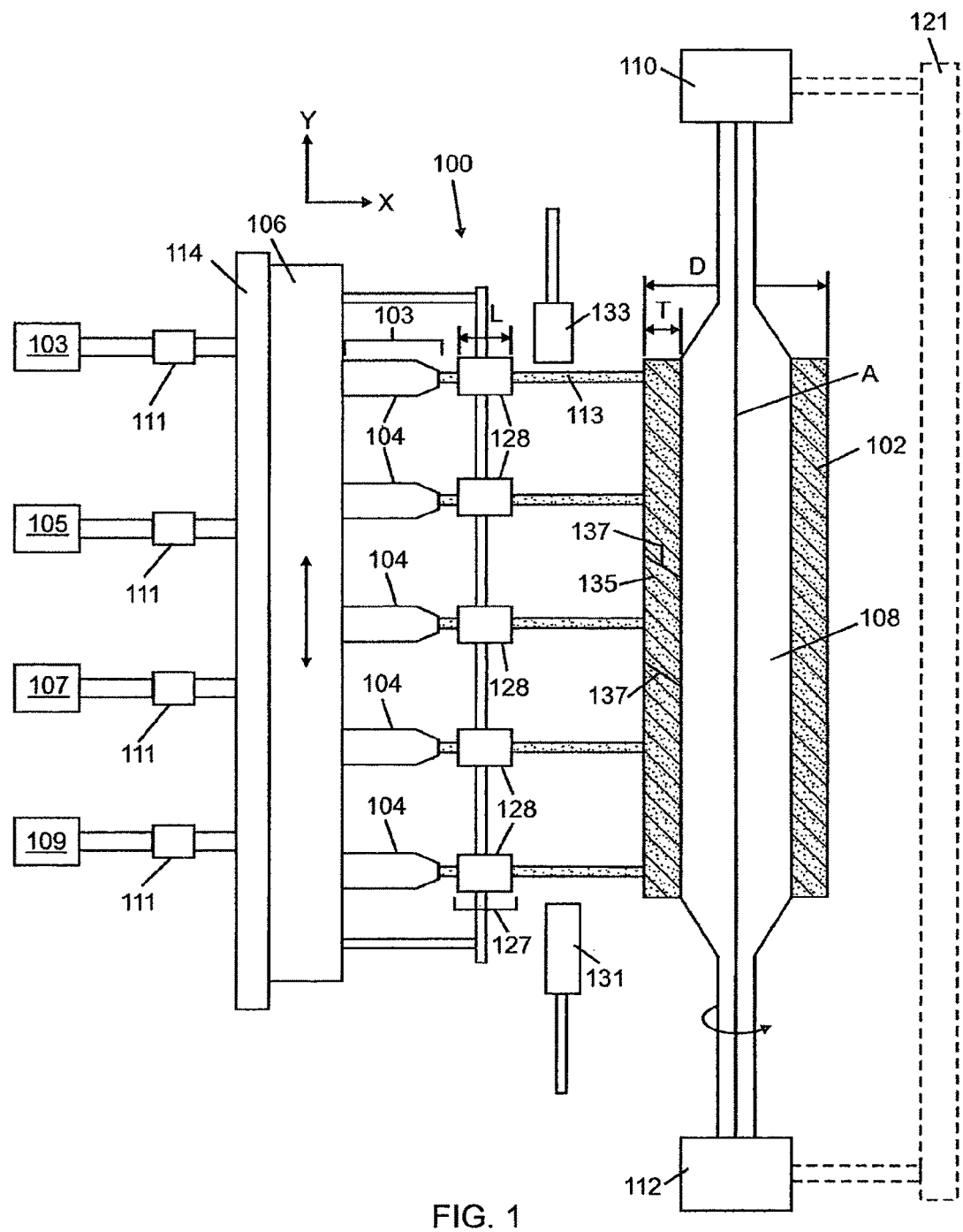
FIG. 1 is a schematic of an apparatus for making a porous preform.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

FIG. 1 depicts an apparatus 100 for making a porous preform 102, which can be subsequently consolidated into dense glass. The apparatus 100 includes an array of burners 103 mounted on and coupled to a manifold 106. In the example depicted in FIG. 1, the array of burners 103 includes a linear arrangement of burners 104. The burners 104 are spaced apart along the manifold 106. In general, the spacing between adjacent burners 104 is equal across the array, although it is also possible to vary the spacing between adjacent burners 104 across the array. The burners 104 may be any suitable burners known in the art for producing soot from glass precursors and process gases. A cylindrical or elongated mandrel or bait 108 is positioned opposite to, and spaced a distance from, the array of burners 104 to collect soot generated by the burners 104. The mandrel or bait 108 may be made of a non-reactive refractory material such as alumina. Typically, the length (or span) of the burner array 104 is longer than the length of the portion of the bait 108 on which the (usable portion of the) porous preform 102 is formed. The distal ends of the mandrel 108 are supported in chucks 110, 112, which may include bearings to allow rotation of the mandrel 108 about its axial axis A.

In one embodiment, a carriage (or any suitable translation device) 114 is coupled to the manifold 106 to move the manifold 106 and the array of burners 103 relative to the mandrel 108. Alternatively, the chucks 110, 112 may be coupled to a carriage (or any suitable translation device), such as indicated at 121, in order to allow the chucks 110, 112 and mandrel 108 to move relative to the array of burners 103. In general, any method of achieving relative motion between the array of burners 103 and the mandrel 108 may be used.

An array of burner shields 127 is arranged between the array of burners 103 and the mandrel 108. Each burner shield 128 is a tubular member and is arranged in line with one of the burners 104. The array of burner shields 127 is preferably coupled to the carriage 114, either directly or through the manifold 106, so that the inline relationship between each burner shield 128 and a corresponding one of the burners 104 is maintained. The burner shields 128 are used to adjust the amount of entrained air around the fume stream from the burners 104 and the temperature at which the soot is deposited on the mandrel 108. In this example, the burner shields 128 have equal lengths (L). In an alternate example, the burner shields 128 may have different lengths.

Apparatus 100 may include auxiliary heaters 131, 133 positioned near the ends of the burner array 103 and generally between the burner array 103 and the mandrel 108 (including chucks 110, 112) to control heat distribution at the end/edge regions of the porous preform 102 formed on the mandrel 108. In general, the auxiliary heaters 131, 133 are heat-only, i.e., not soot-producing, burners and are fixed in position relative to the mandrel 108.

Typically, the various parts of the apparatus 100 involved in generating the soot are enclosed in a chamber or housing (not shown) in which a suitable atmosphere is maintained. For example, the atmosphere in the chamber may be free of moisture and/or contain dry air or dry inert gas to allow production of a porous preform which is substantially free of β-OH.

The manifold 106 is in communication with a source of silica precursor 103, a source of oxygen 105, and a source of fuel 107. The manifold 106 may also be in communication with a source of silica-doping material 109, such as a source of at least one of F, B, Al, Ge, Sn, Ti, P, Se, Er, S, Ca, Ba, Y, Yb, Ta, La, Sb, and Bi. The silica precursor from the source of silica precursor 103 may be delivered to the manifold 106 in vaporous form. This may include converting the silica precursor from the source 103, if not already in vaporous form, into vaporous form.

In operation, silica precursor from source 103, oxygen from source 105, fuel from source 107, and optionally silica-doping material from source 109, are supplied to the manifold 106. Mass flow controllers 111 are used to control the rate at which material is delivered to the manifold 106. The oxygen delivered to the manifold 106 may be in its pure state or may be mixed with inert gases such as nitrogen, argon, helium, or carbon dioxide. The fuel delivered to the manifold 106 may or may not contain hydrogen. The manifold 106 supplies the silica precursor, oxygen, fuel, and optionally silica-doping material to the burners 104. The burners 104 use the oxygen and fuel to generate a flame which reacts with the silica precursor and silica-doping material, if present, to form soot 113. The soot 113 is directed to the mandrel 108 in a direction generally perpendicular to the axial axis A of the mandrel 108. The soot accumulates on the mandrel 108 to form the porous preform 102. Soot generation continues until the porous preform 102 reaches a desired diameter D, or until a desired thickness T of the soot has been collected on the mandrel 108.

After a desired thickness of the soot has been collected on the mandrel 108, the porous preform 102 can be consolidated into dense glass by inserting it, along with the mandrel 108, into a furnace maintained at a temperature or range of temperatures suitable for consolidating silica or doped-silica into dense glass. Subsequently, the mandrel 108 can be removed from the dense glass. There will be a hole in the center of the consolidated preform due to removal of the mandrel 108. The hole can be closed by drawing the consolidated preform using conventional fiber techniques. The drawn preform can be cut into segments and used for various applications, such as a core of an optical waveguide. In another embodiment, the consolidated glass perform may be worked by methods known in the art, such as rolling, squashing, or the like to form a boule. Sections be cut from the boule may be used to form optical elements such as lenses or the like.

While the soot is collected on the mandrel 108, relative oscillatory motion with drift is imparted or provided between the burners 104 and the mandrel 108 to achieve a porous preform 102 having a relatively uniform composition and physical properties. The mandrel 108 is also rotated about its axial axis A to allow formation of a porous preform 102 conforming to the shape of the mandrel 108. The term "oscillatory motion" refers to a reciprocating motion along a direction parallel to the axial axis A of the mandrel 108, or along the Y-axis. It is noted that the axial axis A of the mandrel 108 is parallel to the Y-axis and orthogonal to the direction in which the soot is deposited. The nodes (or return points) of the reciprocating motion may be determined by a sawtooth function or a sinusoidal function or without the aid of any function, i.e., the nodes may simply be expressed as a set of discrete signed displacements, where the sign of the displacement would indicate whether a stroke of the reciprocating motion is in the positive Y-axis direction or in the negative Y-axis direction. The oscillatory motion has a repeat period and may have a constant or varying amplitude.

During each repeat period, the burners 104 are oscillated as described above in a direction parallel to the axial axis A of the mandrel 108, or along the Y-axis. At the end of each repeat period, the array of burners 104 is offset or drifted, still in the same direction along which the oscillatory motion occurs, i.e., in a direction parallel to the axial axis A of the mandrel 108, or along the Y-axis. With this offset or drift, for each new repeat period, the oscillatory motion for each burner 104 starts at a different location than in the previous repeat period. An exemplary oscillatory motion with drift is illustrated in FIG. 2. The zero position on the Y-axis represents the center of the manifold (106 in FIG. 1) to which the burner array (103 in FIG. 1) is coupled. In FIG. 2, during period P, the manifold (106 in FIG. 1) and burners (104 in FIG. 1) move up (i.e., in the positive Y-axis direction) and down (i.e., in the negative Y-axis direction) in tandem, and relative to the mandrel (108 in FIG. 1), as illustrated by the line strokes. As illustrated, the nodes or return points 117 of the burners (104 in FIG. 1) during each stroke of the oscillatory motion may vary to allow more overlapping of the soot generated by adjacent burners (104 in FIG. 1). At the end of the period P, the burners (104 in FIG. 1) move down (i.e., in the negative Y-axis direction) relative to the mandrel (108 in FIG. 1), and the oscillatory motion is repeated. This downward shift is the drift or offset. Arrows 115 are used to indicate where the burner array's drift or offset or shift occurs. The drift can be unidirectional (i.e., only in the negative Y-axis direction or only in the positive Y-axis direction) or bidirectional (i.e., in both the negative Y-axis and positive Y-axis directions). For example, in FIG. 2, the drift is unidirectional, with the burner array shifting down (i.e., in the negative Y-axis direction) after each repeat period. In FIG. 3, the drift is bidirectional, with the burner array either shifting down (i.e., in the negative Y-axis direction) or shifting up (i.e., in the positive Y-axis direction) after each repeat period.

Figure 4A:
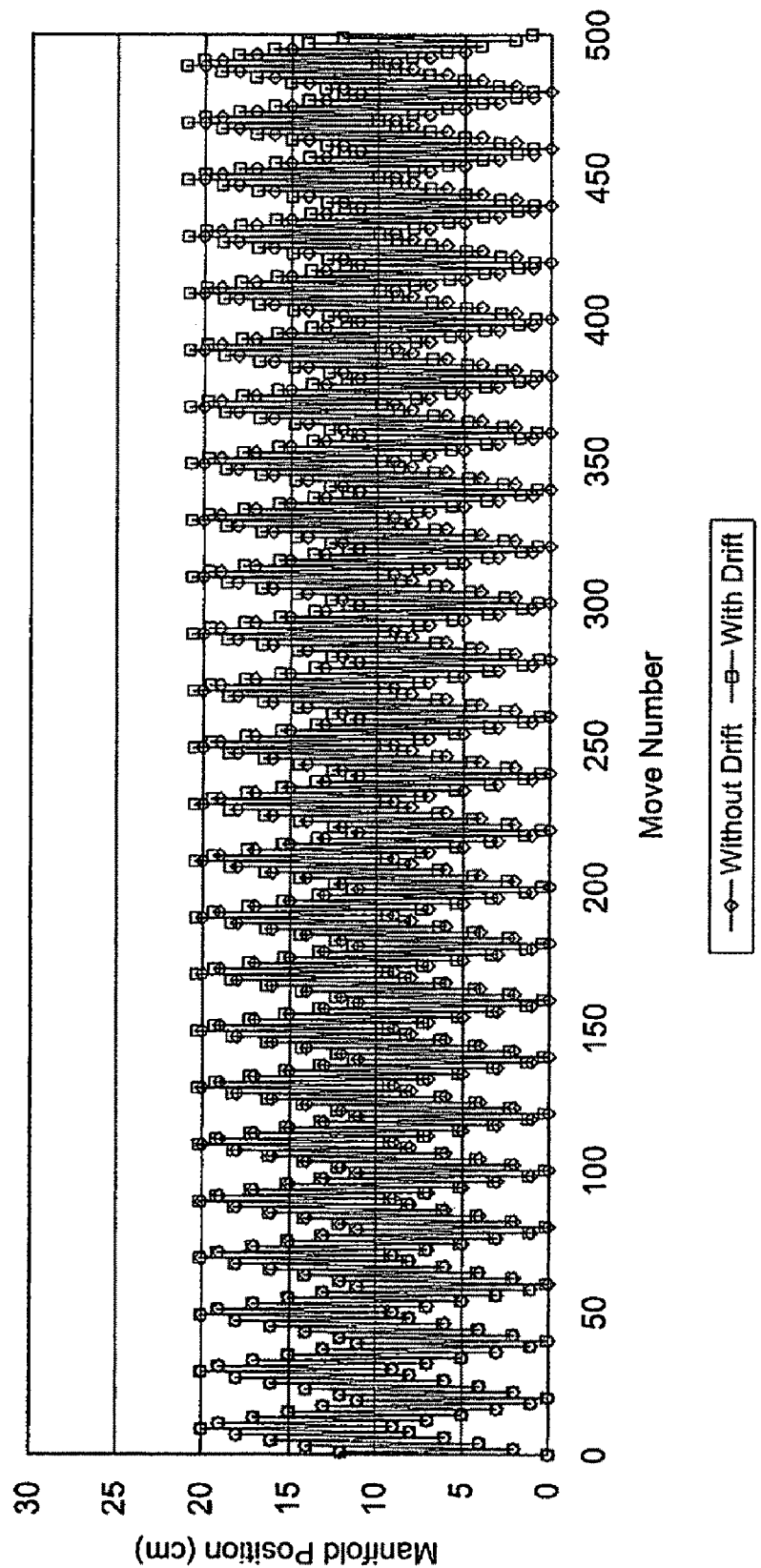
FIG. 4A is a graph depicting manifold position versus manifold move number for a manifold with attached burners oscillating with drift and manifold position versus manifold move for a manifold with attached burners oscillating without drift.
Figure 4B:
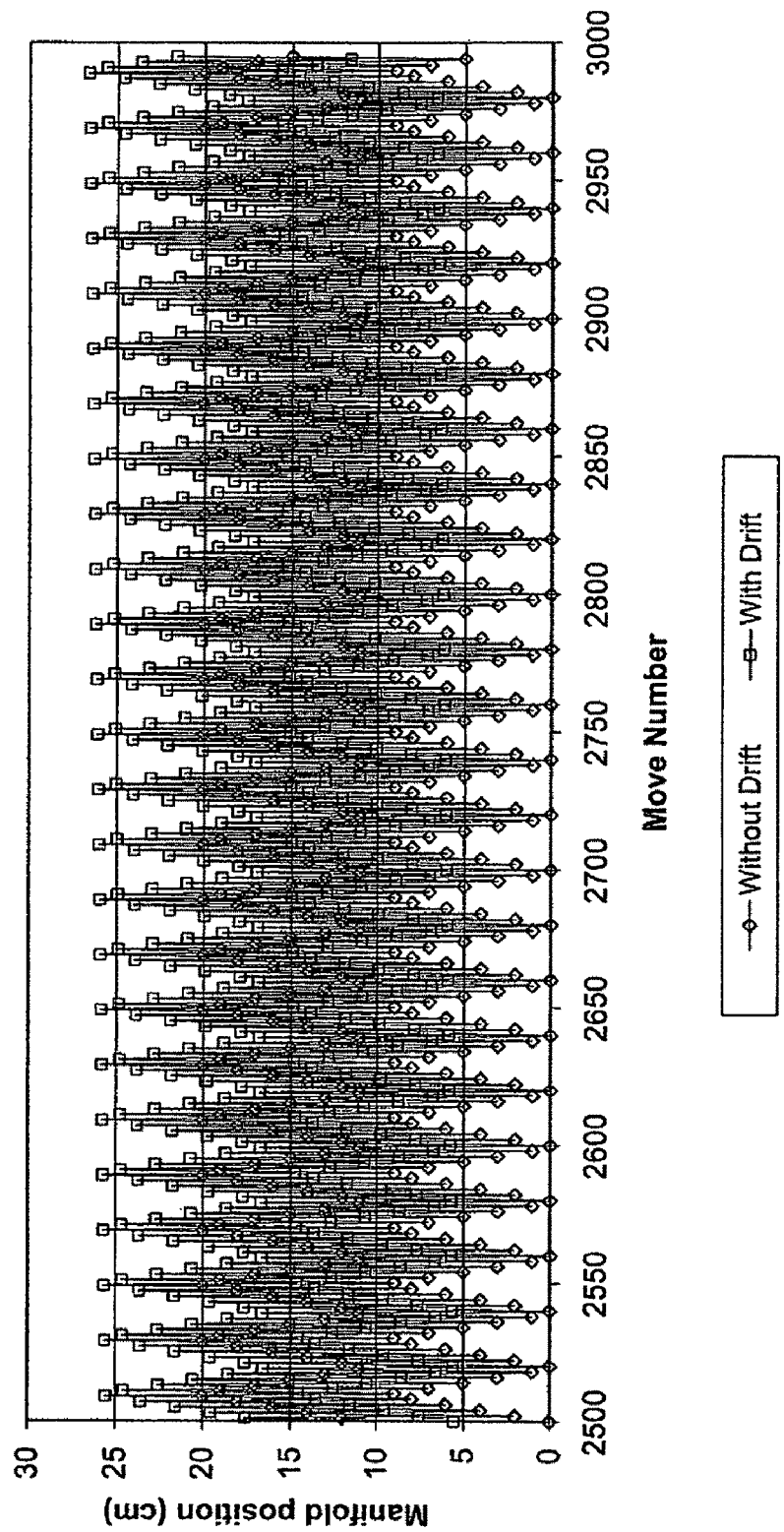
FIG. 4B is a continuation of the graph in FIG. 4A.

FIGS. 4A and 4B show a comparison between an oscillatory motion with drift and an oscillatory motion without drift. The graphs in FIGS. 4A and 4B are shown in terms of manifold position versus move number, where the move number is directly related to time. In the example shown in FIGS. 4A and 4B, the total drift distance was 6 cm, with the drift being unidirectional and in the positive Y-axis direction. The repeat period was 146.7 seconds, and each drift per repeat period was 0.04 cm. In general, the greater the number of drifts over the entire soot deposition period, the better the homogeneity of the formed porous preform (102 in FIG. 1). The amount of drift or offset of the burner array (103 in FIG. 1) may be the same or may vary over the entire soot generation period.

Returning to FIG. 1, each burner 104 deposits a small section of the porous preform 102. This small section is indicated at 135 for one burner 104. The section 135 has opposite sides 137 which are slanted relative to the axial axis A of the mandrel 108 due to the oscillatory motion with drift of the burner 104 while the soot is being collected on the mandrel 108. Without the drift, the opposite sides 137 would be generally perpendicular to the axial axis A of the mandrel 108. A series of such sections 135 constitute the porous preform 102. In general, the drift or offset amount of the array of burners 103 after each repeat period should be smaller than the maximum amplitude of the oscillatory motion.

Figure 5:
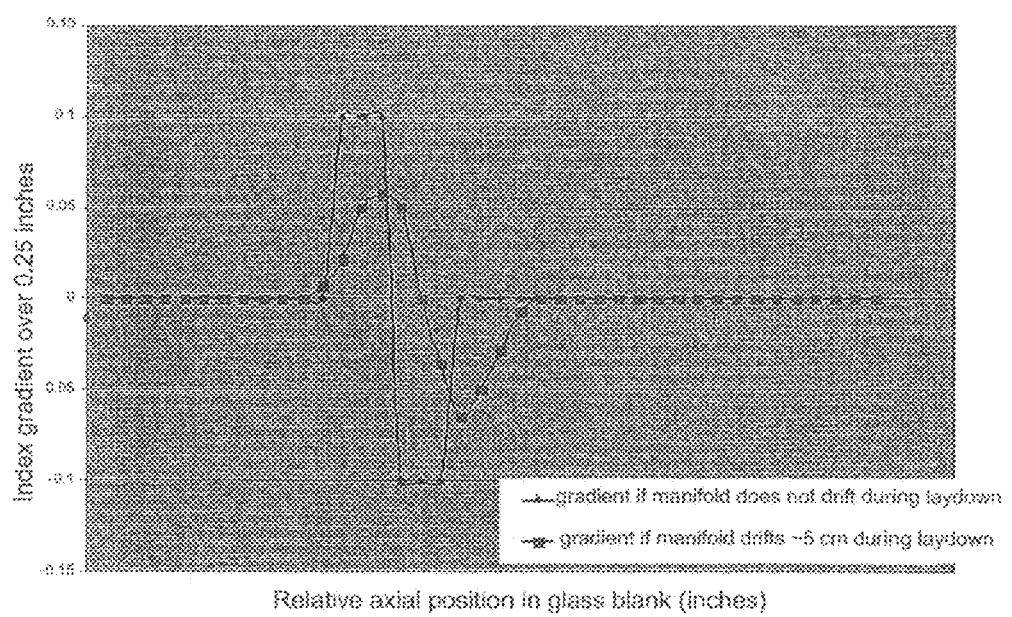
FIG. 5 is a graph comparing index gradient versus axial position in a fused silica glass blank made while oscillating burners with and without drift.

The oscillatory motion with drift described above is effective in edge-blending the soot in adjacent sections of the porous preform 102 (corresponding to adjacent burners 104), thereby improving the uniformity of the composition and physical properties of the porous preform 102. FIG. 5 is a graph comparing the effect of oscillatory motion without drift and oscillatory motion with drift on the index of refraction of fused silica glass. The graph shows that the oscillatory motion with drift results in relatively smaller index of refraction gradients in the fused silica glass in comparison to the oscillatory motion without drift.

Figure 6:
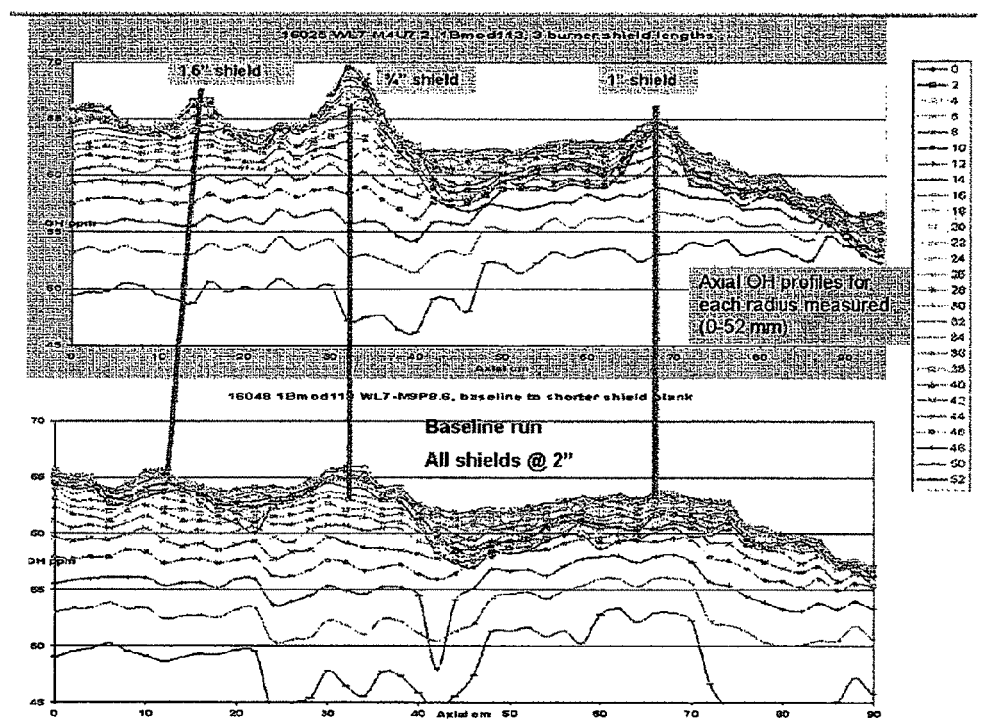
FIG. 6 is a graph showing axial OH profiles for fused silica glass produced by equal length and variable length burner shields, respectively.

Returning to FIG. 1, there may be differences in the design or dimensions of the burners 104 or rate of flow of material to the burners 104 so that the amount and density of soot generated by the burners 104 vary along the array of burners 104. This would lead to variations in the diameter D or thickness T of the porous preform 102 formed on the mandrel 108. There is a correlation between variation in diameter (or thickness) of the preform and variations in OH and index of refraction of the silica glass blank formed from the preform. Thus, it is desirable to reduce or eliminate such variation in diameter (or thickness). FIG. 6 shows axial OH profiles for two fused silica glasses. For the axial OH profile shown in the top portion of the graph, burner shields having different lengths were used while depositing the soot. For the axial OH profile shown in the bottom portion of the graph, burner shields having equal lengths were used while depositing the soot. The graph shows that axial OH profile can be adjusted by adjusting the length of the burner shields. In particular, the length of the burner shields can be selected such that variation in diameter (or thickness) of the porous preform produced is relatively low or negligible.

Figure 7:
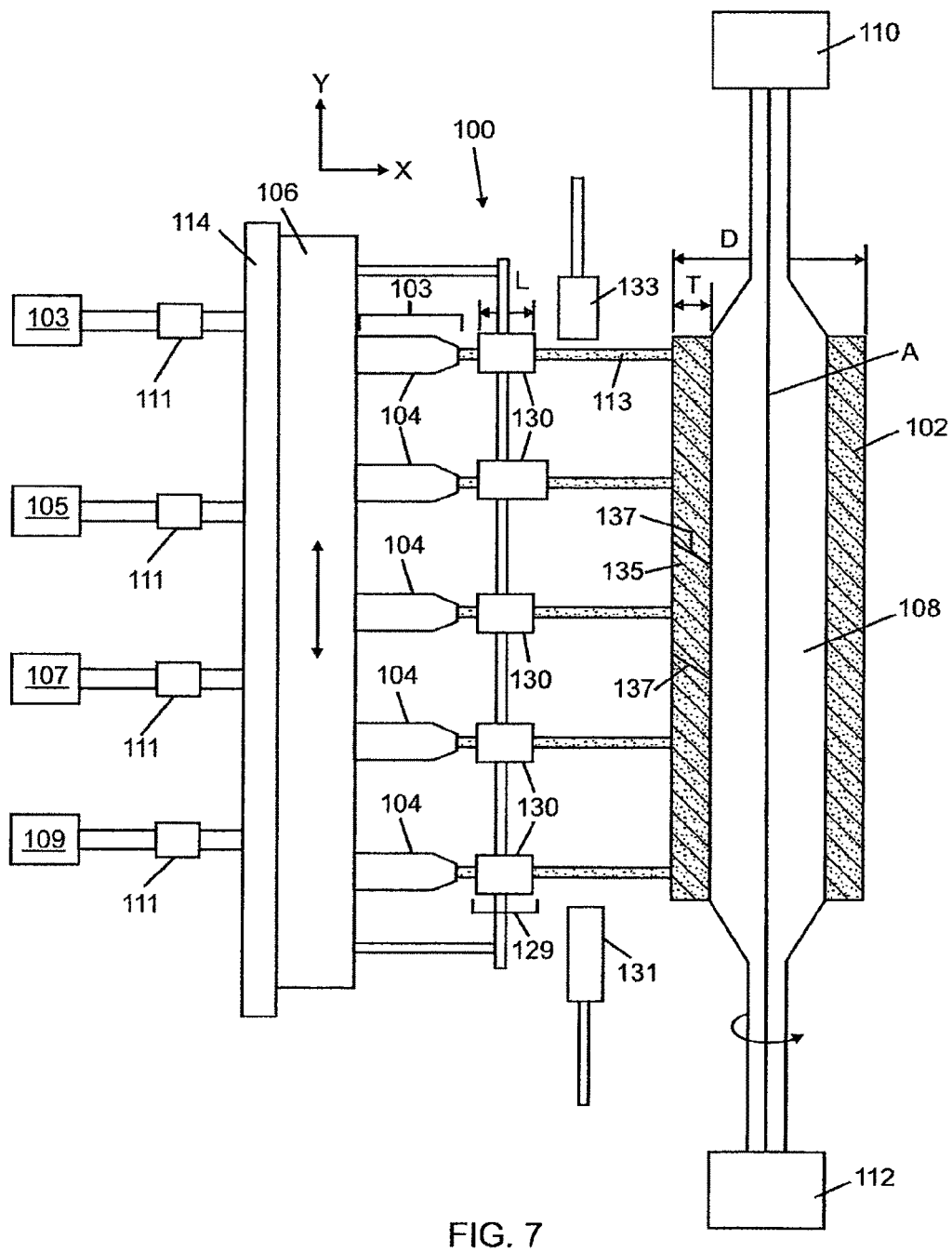
FIG. 7 shows the apparatus of FIG. 1 with an array of burner shields having variable lengths.

FIG. 7 shows apparatus 100 with an array of burner shields 129 arranged between the array of burners 104 and the mandrel 108. The array of burner shields 129 includes individual burner shields 130. As in the example shown in FIG. 1, each burner shield 130 is in line with a corresponding one of the burners 104. Further the array of burner shields 129 moves together with the array of burners 104 so that soot can be directed to the mandrel 108 through the burner shields. The lengths (L) of the burner shields 130 vary across the array, from one burner to the next. In general, the lengths of the burner shields 130 are tailored to the operating conditions of the corresponding burners 104 so that a uniform thickness of the soot is deposited across the mandrel 108. In one example, the ideal length of each burner shield 130 is determined via a calibration process that involves forming a test porous preform on the mandrel 108. The test porous preform is formed by using the burner array 104 to generate soot and directing the soot onto the mandrel 108 through burner shields having equal lengths. Next, deviation in thickness T of the test porous preform from an average or reference thickness is determined along the length of the test porous preform. The deviation in thickness along the length of the test porous preform is used to determine the ideal length of each burner shield 130. Because each burner 104 deposits in a small section of the porous preform, the deviation in thickness observed at each burner position can be readily determined by mapping the porous preform to the burner positions. In one example, the ideal length of each burner shield 130 is determined by the expression x=(y+4.8935)/2.5652, where x is the ideal length of the burner shield and y is the expected deviation in thickness of the porous preform assuming the porous preform had been produced using burner shields having equal lengths. The thickness of the porous preform considered herein is the same as the thickness of the soot deposited on the bait, measured from the surface of the bait to the surface of the porous preform.

Figure 8:
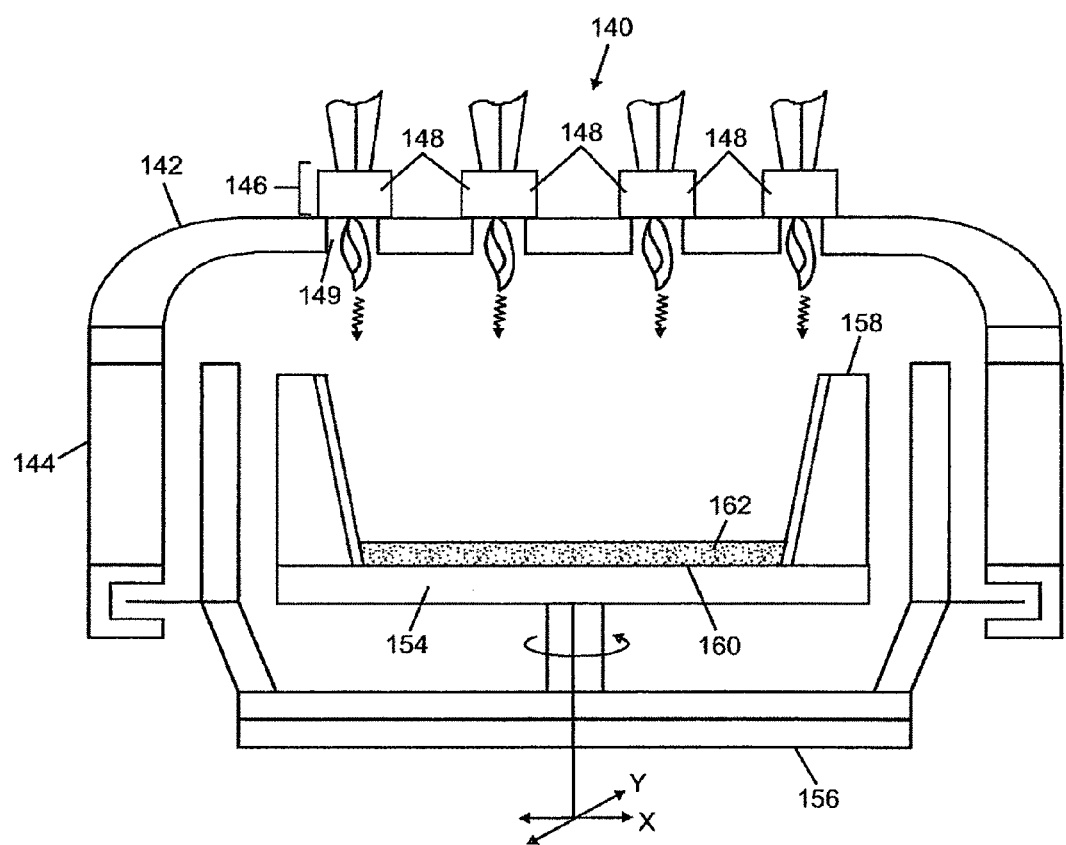
FIG. 8 is a schematic of an apparatus for forming a porous preform or boule via a planar soot deposition process.

The method of forming a porous preform described above is an outside vapor deposition process. However, the relative oscillatory motion with drift described above is not limited to an outside vapor deposition process. The same principle may be used, for example, in a planar soot deposition process where the bait for collecting soot is planar. FIG. 8 illustrates a planar soot deposition apparatus 140 including a furnace crown 142 and a furnace ring wall 144 which supports the furnace crown 142. An array of burners 146 is mounted in the furnace crown 142. The array of burners 146 includes individual burners 148, which may be any suitable burners known in the art for producing soot from glass precursors and process gases. The burners 148 may have a linear arrangement or a spiral arrangement. A spiral burner arrangement is described in, for example, U.S. Pat. No. 5,696,038, issued to John E. Maxon. Although not shown, the burners 148 communicate with a manifold, such as manifold 106 in FIG. 1, which is in communication with a source of silica precursor, a source of oxygen, a source of fuel, and optionally a source of silica-doping material. Although not shown, auxiliary heaters, such as auxiliary heaters 131, 133 in FIG. 1, may be mounted in the furnace crown 142, near the ring wall 144. The holes 149 in the furnace crown 142, above which the burners 148 are mounted, may serve as burner shields. Alternatively, burner shields may be mounted in the holes 149. The holes 149 (or burner shields if mounted in the holes 149) may have equal or variable lengths, as described for the burner shields in the previous example. The apparatus 140 includes a rotatable base 154 positioned within the furnace ring wall 144 and in opposing and spaced relation to the furnace crown 142. The rotatable base 154 is mounted on a table 156, which allows oscillatory/drift motion of the rotatable base 154 relative to the burner array 146. The table 156 may be any suitable translation stage, such as an x-y or x-y-z translation stage. The table 156 may include a rotational stage for rotating the rotatable base 154.

A containment vessel 158 is mounted on the rotatable base 154. The bottom 160 of the containment vessel 158 is covered with bait sand 162, which provides the planar surface for collecting soot produced by the array of burners 146. The containment vessel 158 may or may not be maintained at consolidation temperatures. Where the containment vessel 158 is maintained at consolidation temperatures, the soot immediately consolidates into dense glass upon being deposited on the bait sand 162. Where the containment vessel 158 is not maintained at consolidation temperatures, the soot results in a porous preform which is subsequently consolidated. With the apparatus 140, the containment vessel 158, including the bait sand 162 on which the soot is collected, experiences the previously-described oscillatory/drift motion. With the apparatus 140, drift is any slowly changing motion in the X, Y or both X and Y directions, where X and Y are in the plane of the planar deposition surface provided by the bait sand 162.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming a fused silica glass blank, comprising:
    generating soot using an array of soot producing burners;
    directing the soot along a first direction onto a bait;
    collecting the soot on the bait;
    imparting a relative oscillatory motion having a repeat period between the array of soot producing burners and the bait along a second direction orthogonal to the first direction for a first time period equal to the repeat period while collecting the soot, the relative oscillatory motion having a starting position along the second direction;
    after the first time period, repeating the imparting of said relative oscillatory motion for a second time period equal to the repeat period; and before repeating the imparting, offsetting the starting position of the relative oscillatory motion by a selected distance along the second direction wherein the relative oscillatory motion has a plurality of return points over the repeat period, and wherein the return points are varying over the repeat period.

2. The method of claim 1, further comprising rotating the bait while imparting relative oscillatory motion.

3. The method of claim 1, further comprising disposing an array of burner shields between the array of burners and the bait, wherein each burner shield is arranged in line with one of the burners.

4. The method of claim 3, further comprising imparting the relative oscillatory motion having the repeat period between the array of burner shields and the bait.

5. The method of claim 3, wherein directing the soot along the first direction comprises directing the soot through the array of burner shields.

6. The method of claim 5, wherein disposing the array of burner shields comprises determining an ideal length for each burner shield to achieve a uniform thickness of the soot on the bait.

7. The method of claim 6, wherein determining an ideal length for each burner shield comprises estimating expected deviation in thickness of the soot collected on the bait from a predetermined thickness and assuming the burner shields have equal lengths.

8. The method of claim 7, wherein determining an ideal length for each burner shield further comprises calculating the ideal length for each burner shield which compensates for the expected deviation.

9. The method of claim 7, wherein determining an ideal length for each burner shield further comprises calculating the ideal length for each burner shield according to the expression $x=(y+4.8935)/2.5652$, where x is the ideal length of the burner shield and y is the expected deviation in thickness of the soot.

10. The method of claim 1, wherein the soot collected on the bait forms a porous preform and wherein the method further comprises consolidating the porous preform.

* * * * *